(12) United States Patent
Bito

(10) Patent No.: US 7,360,789 B2
(45) Date of Patent: Apr. 22, 2008

(54) AIRBAG DEVICE FOR FRONT PASSENGER'S SEAT

(75) Inventor: Kazuaki Bito, Aichi (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 314 days.

(21) Appl. No.: 11/038,120

(22) Filed: Jan. 21, 2005

(65) Prior Publication Data

US 2005/0161918 A1 Jul. 28, 2005

(30) Foreign Application Priority Data

Jan. 27, 2004 (JP) ............................ 2004-018432

(51) Int. Cl.
| | |
|---|---|
| B60R 21/16 | (2006.01) |
| B60R 21/205 | (2006.01) |
| B60R 21/231 | (2006.01) |
| B60R 21/233 | (2006.01) |
| B60R 21/26 | (2006.01) |

(52) U.S. Cl. .................. 280/743.1; 280/732; 280/729; 280/743.2; 280/740

(58) Field of Classification Search ................ 280/732, 280/729, 743.2, 740, 743.1
See application file for complete search history.

(56) References Cited

U.S. PATENT DOCUMENTS

| | | | | |
|---|---|---|---|---|
| 5,018,762 A | * | 5/1991 | Suzuki et al. ................ | 280/731 |
| 5,306,043 A | * | 4/1994 | Mihm et al. ................ | 280/732 |
| 5,308,113 A | * | 5/1994 | Moriset ..................... | 280/743.2 |
| 5,362,101 A | * | 11/1994 | Sugiura et al. ........... | 280/743.2 |
| 5,505,485 A | * | 4/1996 | Breed ......................... | 280/729 |
| 5,520,413 A | * | 5/1996 | Mossi et al. ................ | 280/729 |
| 6,302,433 B1 | * | 10/2001 | Ellerbrok et al. ........... | 280/729 |
| 6,536,800 B2 | * | 3/2003 | Kumagai et al. ........ | 280/743.1 |
| 6,655,714 B2 | * | 12/2003 | Fellhauer et al. ........ | 280/743.1 |
| 6,786,505 B2 | * | 9/2004 | Yoshida ..................... | 280/729 |
| 6,802,534 B2 | * | 10/2004 | Neupert .................... | 280/743.1 |
| 7,000,947 B2 | * | 2/2006 | Kumagai et al. ........... | 280/732 |
| 2001/0052691 A1 | * | 12/2001 | Bieber et al. ............. | 280/730.1 |
| 2003/0030254 A1 | * | 2/2003 | Hasebe ....................... | 280/729 |

FOREIGN PATENT DOCUMENTS

JP A-2002-255004 9/2002

* cited by examiner

Primary Examiner—Paul N. Dickson
Assistant Examiner—Joselynn Y. Sliteris
(74) Attorney, Agent, or Firm—Posz Law Group, PLC

(57) ABSTRACT

An airbag device for front passenger's seat of the present invention includes an airbag folded and housed in a case. A rear side face of the airbag as completely deployed confronts an occupant and serves as a restraint face. The airbag includes an upper inflatable portion and a lower inflatable portion arranged vertically at airbag inflation. Rear side faces of each of the upper and lower inflatable portions define upper part and lower part of the restraint face. A lower wall of the upper inflatable portion and a top wall of the lower inflatable portion contact and overlap with each other as the airbag is completely inflated, and contacting face of the top wall and the lower wall is wide enough to stay contacted even when either the upper inflatable portion or the lower inflatable portion restrains a part of occupant.

2 Claims, 7 Drawing Sheets

AIRBAG DEVICE FOR FRONT PASSENGER'S SEAT

The present invention relates to an airbag device for a front passenger's seat including an airbag which is folded and housed in a case mounted on an instrument panel (as will be called "dashboard" hereinafter) in front of the front passenger's seat, and is deployable rearward and toward an occupant when fed with inflation gas.

BACKGROUND OF THE INVENTION

1. Field of the Invention

The present invention relates to an airbag device for front passenger's seat including an airbag which is folded and housed in a case mounted on an instrument panel (as will be called "dashboard" hereinafter) in front of front passenger's seat, and is deployable rearward and toward an occupant when fed with inflation gas.

2. Description of Related Art

In the prior art, Japanese Laid-Open No. 2002-255004 discloses an airbag device for a front passenger's seat. In this airbag device, a rear side face of an airbag confronts a passenger and serves as a restraint face. The air bag is so folded and housed that the restraint face is broadly developed so as not to give partial pressure to the passenger. However, in the airbag device for the front passenger's seat in the prior art, the restraint face is arranged in substantially all areas of a rear side of the inflated airbag. In other words, a conventional airbag device for the front passenger's seat protects the occupant's head and breast with a wide and plane restraint face, and therefore, there was a room for improvement in properly protecting the occupant while suppressing a reaction force applied to the occupant when an inflated airbag engages an occupant. Especially when the breast of an occupant engages the restraint face of the inflated airbag prior to head, a part of the restraint face recesses while the other part protrudes, and thereby a tension is generated in all over the restraint face. This tension is liable to increase the reaction force applied to the occupant's head when a head engages the restraint face.

Moreover, since airbags usually inflate more widely in the vertical direction, in protecting a small-sized occupant, when the occupant engages a restraint face of an inflated airbag, the extra portion of the airbag above the occupant's head is pulled downward toward the occupant by a tension generated in all areas of the restraint face along with the engagement of the occupant, and is likely to press the occupant's head from above.

SUMMARY OF THE INVENTION

The object of the present invention is to provide an airbag device for front passenger's seat capable of protecting an occupant properly while suppressing reaction force when an occupant engages an airbag.

The object of the present invention is achieved by an airbag device for front passenger's seat including an airbag folded and housed in a case mounted on an instrument panel in front of front passenger's seat, and deployable rearward and toward an occupant when fed with inflation gas, wherein:

a rear side face of the airbag as completely deployed confronts the occupant and serves as a restraint face;

the airbag includes an upper inflatable portion and a lower inflatable portion arranged vertically at airbag inflation, and rear side faces of each of the upper and lower inflatable portions define upper part and lower part of the restraint face;

a lower wall of the upper inflatable portion and a top wall of the lower inflatable portion contact and overlap with each other as the airbag is completely inflated; and contacting face of the top wall and the lower wall is wide enough to stay contacted when either the upper inflatable portion or the lower inflatable portion restrains a part of occupant.

In the airbag device for front passenger's seat of the present invention, at complete inflation of the airbag, breast of an occupant usually engages a lower restraint face located in rear side of the lower inflatable portion, and then a head of the occupant engages an upper restraint face located in rear side of the upper inflatable portion. The lower wall of the upper inflatable portion and the top wall of the lower inflatable portion contact and overlap with each other when the airbag is completely inflated, and this contacting face has enough area to stay contacted even when either the upper inflatable portion or the lower inflatable portion restrains a part of the occupant. Accordingly, even if a part of the restraint face of the lower inflatable portion contacting the breast of the occupant recesses forward and thereby a tension is generated in the walls of the lower inflatable portion, the lower wall of the upper inflatable portion is not pulled directly along with deformation of the lower inflatable portion, since the lower wall of the upper inflatable portion merely contacts and overlaps with the top wall of the lower inflatable portion.

In other words, the tension generated in the restraint face of the lower inflatable portion by engagement of the breast of the occupant does not affect the restraint face of the upper inflatable portion to contact with a head of the occupant. Accordingly, in comparison with a case, as in a conventional airbag, where head and breast of an occupant are restrained by one restraint face, the airbag restrains the head by the restraint face in the upper inflatable portion in a condition that an increase of reaction force caused by the tension is suppressed. As a result, the airbag restrains the head of the occupant with more cushioning property while suppressing reaction force.

Moreover, in the airbag device of the present invention, when a small-sized occupant is seated in the front passenger's seat, head of the occupant engages a restraint face located in rear side of the lower inflatable portion. At this time, even if the restraint face of the lower inflatable portion contacting the head recesses forward and thereby a tension is generated in the walls of the lower inflatable portion, the lower wall of the upper inflatable portion is not pulled directly along with deformation of the lower inflatable portion. Accordingly, the inflated upper inflatable portion is not pulled downward nor presses the head from upward, so that the airbag protects the small-sized occupant properly with the lower inflatable portion.

Therefore, when occupants engage the completely inflated airbag, the airbag device of the present invention protects the occupants properly while suppressing reaction force.

In the above airbag device for front passenger's seat, it is desired that the airbag includes a communication hole located forward of the top wall and the lower wall for communicating the upper inflatable portion with the lower inflatable portion, and a gas inlet port located in a front part of the airbag as inflated and communicated with the communication hole for feeding the airbag with inflation gas.

With this construction, one inlet port serves to supply inflation gas both to the upper inflatable portion and the lower inflatable portion. Accordingly, supply of inflation gas to the airbag is done by a single inflator, so that the airbag device itself is downsized, and manufacturing cost of the device is also reduced.

If the above airbag further includes a tether connecting front ends of the lower wall and top wall and periphery of the gas inlet port, moreover, when the airbag is inflated, the tether pulls the front ends of the lower wall and top wall toward the gas inlet port, and thus prevents the lower wall and top wall from being separated during inflation of the airbag.

If the above airbag further includes a flow regulating cloth which is open-ended toward the upper and lower inflatable portions for supplying inflation gas flown in from the gas inlet port to the upper and lower inflatable portions, the flow regulating cloth serves to supply inflation gas from the gas inlet port to the upper and lower inflatable portion securely.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Up-down, front-rear and left-right in this specification are based on a state in which an airbag device M for front passenger's seat is mounted on vehicle, and therefore, correspond to up-down, front-rear and left-right of vehicle.

Figure 1:
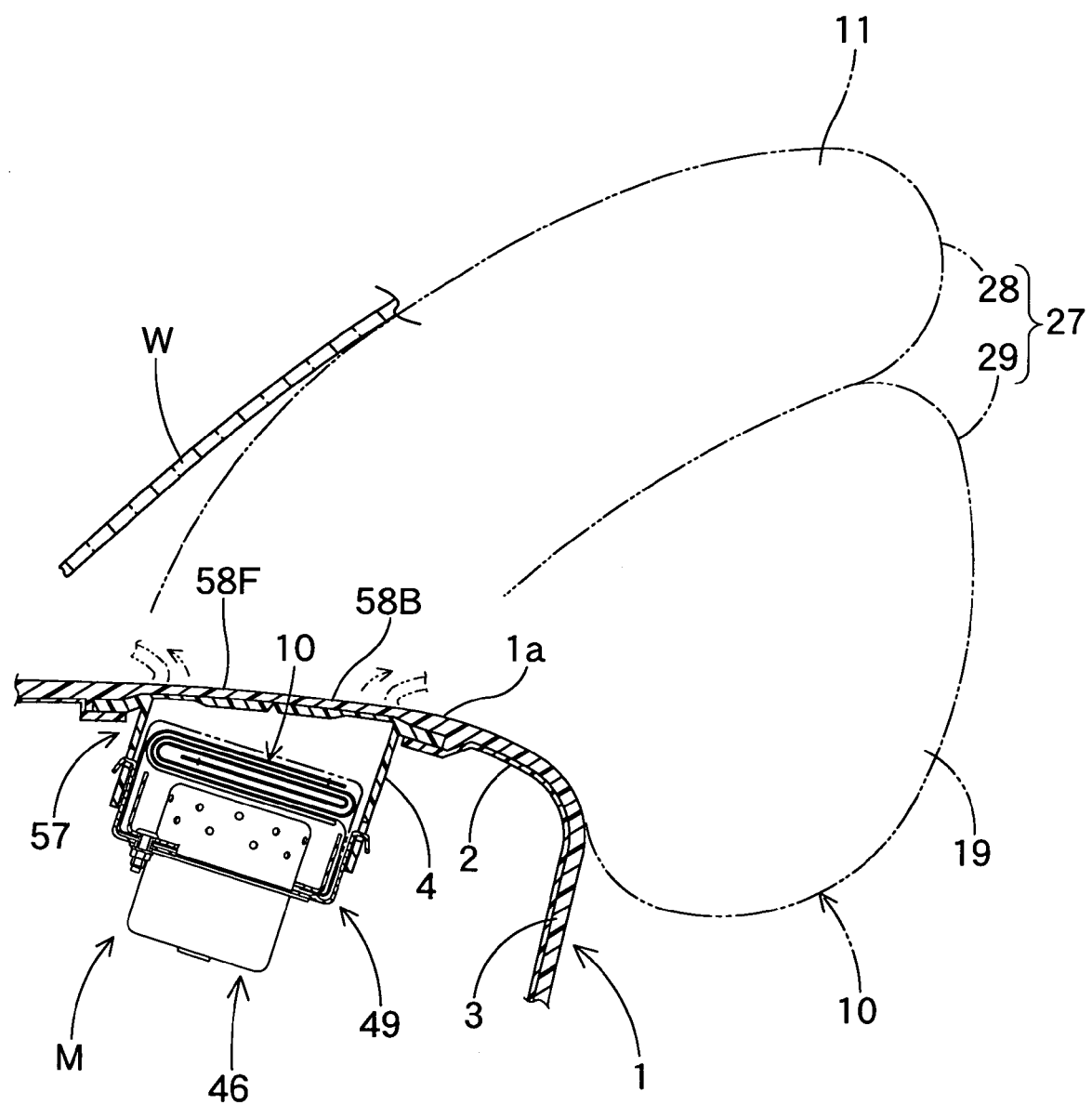
FIG. 1 is a sectional view of an embodiment of the airbag device for front passenger's seat according to the present invention, taken along front-rear direction.
Figure 2:
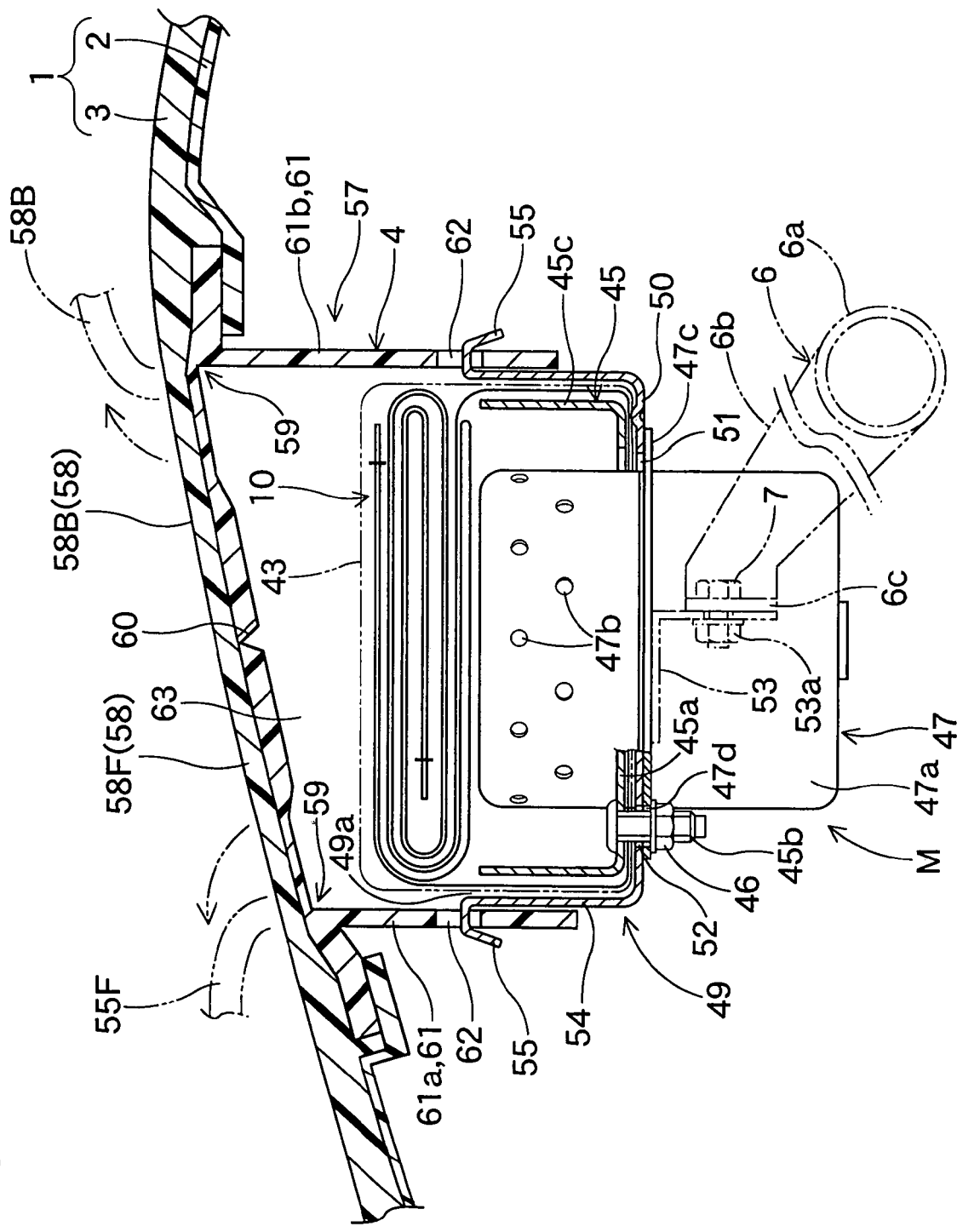
FIG. 2 is a schematic enlarged section of the airbag device of FIG. 1, taken along front-rear direction.

FIGS. 1 and 2 illustrate an embodiment of the airbag device M for front passenger's seat. The airbag device M is arranged inside of a top surface 1a of a dashboard (or an instrument panel) 1. This airbag device M includes a folded airbag 10, an inflator 47 for supplying the airbag 10 with inflation gas, a case 49 for housing and holding the airbag 10 and the inflator 47, a retainer 45 for attaching the airbag 10 to the case 49, and an airbag cover 57 for covering the folded airbag 10.

As shown in FIGS. 1 to 4, the airbag cover 57 is integral with the dashboard 1 in the illustrated embodiment. The dashboard 1 includes a base 2 defining a back side and a cover layer 3 covering an outer surface of the base 2. The base 2 is made from hard synthetic resin such as polypropylene, and the cover layer 3 includes a foamed layer of foamable polyurethane or the like, and a skin layer. The airbag cover 57 includes a soft portion 4 made from soft synthetic resin such as thermo-plastic elastomer of polyolefin or the like, instead of the base 2. The airbag cover 57 includes two doors 58 (58F and 58B) provided therearound with a thinned breakable portion 60. The breakable portion 60 is arranged in an H-shape as viewed from above the dashboard 1. The two doors 58F and 58B open toward forward and rearward, respectively, around their front or rear ends serving as hinge lines 59.

The airbag cover 57 further includes a joint wall 61 projected downward in a generally square cylindrical shape from back side to encircle arrangement positions of the doors 58F and 58B. The joint wall 61 includes walls 61a and 61b confronting each other in front-rear direction, and the walls 61a and 61b are provided with a plurality of retaining holes 62 at predetermined positions thereof. Retaining pawls 55 of the case 49 are inserted into these retaining holes 62 so as to retain the joint wall 61.

In the illustrated embodiment, the soft portion 4 is arranged in back side of the doors 58F and 58B of the airbag cover 57, and in front and rear sides of the joint wall 61 in the vicinity of the hinge lines 59 of the doors 58F and 58B in back side of the dashboard 1. Moreover, the soft portion 4 forms the joint wall 61 itself.

As shown in FIGS. 1 and 2, the case 49 is made of sheet metal into a generally rectangular parallel piped shape provided with a rectangular opening 49a at top. The case 49 includes a bottom wall 50 having a rectangular plate shape, and a side wall 54 extending upward and toward the airbag cover 57 in a generally square cylindrical shape from outer edge of the bottom wall 50. The bottom wall 50 has a rectangular plate shape elongate in left-right direction, and includes in its center a generally round insert hole 51 for inserting an upper part of the inflator 47 from lower side toward the airbag cover 57. In a periphery of the insert hole 51 of the bottom wall 50 are mounting holes 52 for inserting bolts 45b of the retainer 45 therethrough. The bottom wall 50 is further provided in left and right portions of a lower side thereof with brackets 53 for securing the case 49 to vehicle body 6. Each of the brackets 53 is provided with a nut 53a for fastening a bolt 7 thereinto. At side of the vehicle body 6, brackets 6b extend from reinforcement 6a, and the bolts 7 are inserted through mounting seats 6c of the brackets 6b and fastened into the nuts 53a. By fastening the bolts 7 into the nuts 53a, the case 49, or the airbag device M is secured to the vehicle body 6.

The side wall 54 of the case 49 is provided at front and rear upper ends thereof with a plurality of retaining pawls 55 turning outward and downward. As described above, the retaining pawls 55 are inserted into the retaining holes 62 of the joint wall 61 of the airbag cover 57 so as to retain the joint wall 61.

As shown in FIGS. 1 and 2, the inflator 47 has a disc shape including a generally columnar body 47a provided on top surface with a plurality of gas discharge ports 47b. The inflator 47 is further provided in an outer circumference of the body 47a with a flange 47c for helping attach the inflator 47 to the case 49. The flange 47c is projected from the outer circumference of the body 47a in a generally square annular shape (or in a generally square plate shape), and is provided at its four corners with mounting holes 47d. The individual mounting holes 47d are placed in positions corresponding to the individual mounting holes 52 of the bottom wall 50 of the case 49. Each of the mounting holes 47d has the same internal diameter as that of the mounting hole 52.

The retainer 45 is made of sheet metal, and includes a base 45a and a guide wall 45c. The base 45a has an insert hole opened generally in the same shape as the insert hole 51 of the case 49. The guide wall 45c extends upward toward the airbag cover 57 from outer edge of the base 45a in a generally square cylindrical shape. The base 45a has a generally square outline, and is provided at four corners thereof with bolts 45b extending downward. When the retainer 45 is arranged within the airbag 10, the individual bolts 45b are inserted through the mounting holes 33 of the airbag 10, the mounting holes 52 of the bottom wall 50 of the case 49, and the mounting holes 47d of the flange 47c of the inflator 47, and are fastened into nuts 46. Thus the airbag 10 and the inflator 47 are attached to the bottom wall 50 of the case 49. In other words, when the bolts 45b are fastened into the nuts 46, a periphery 31 of a later-described gas inlet port 32 of the airbag 10 is pressed onto the bottom wall 50 by the base 45a, thereby attaching the airbag 10 to the bottom wall 50, while the flange 47c of the inflator 47 is pressed onto a periphery of the insert hole 51, thereby attaching the inflator 47 to the bottom wall 50.

Figure 3:
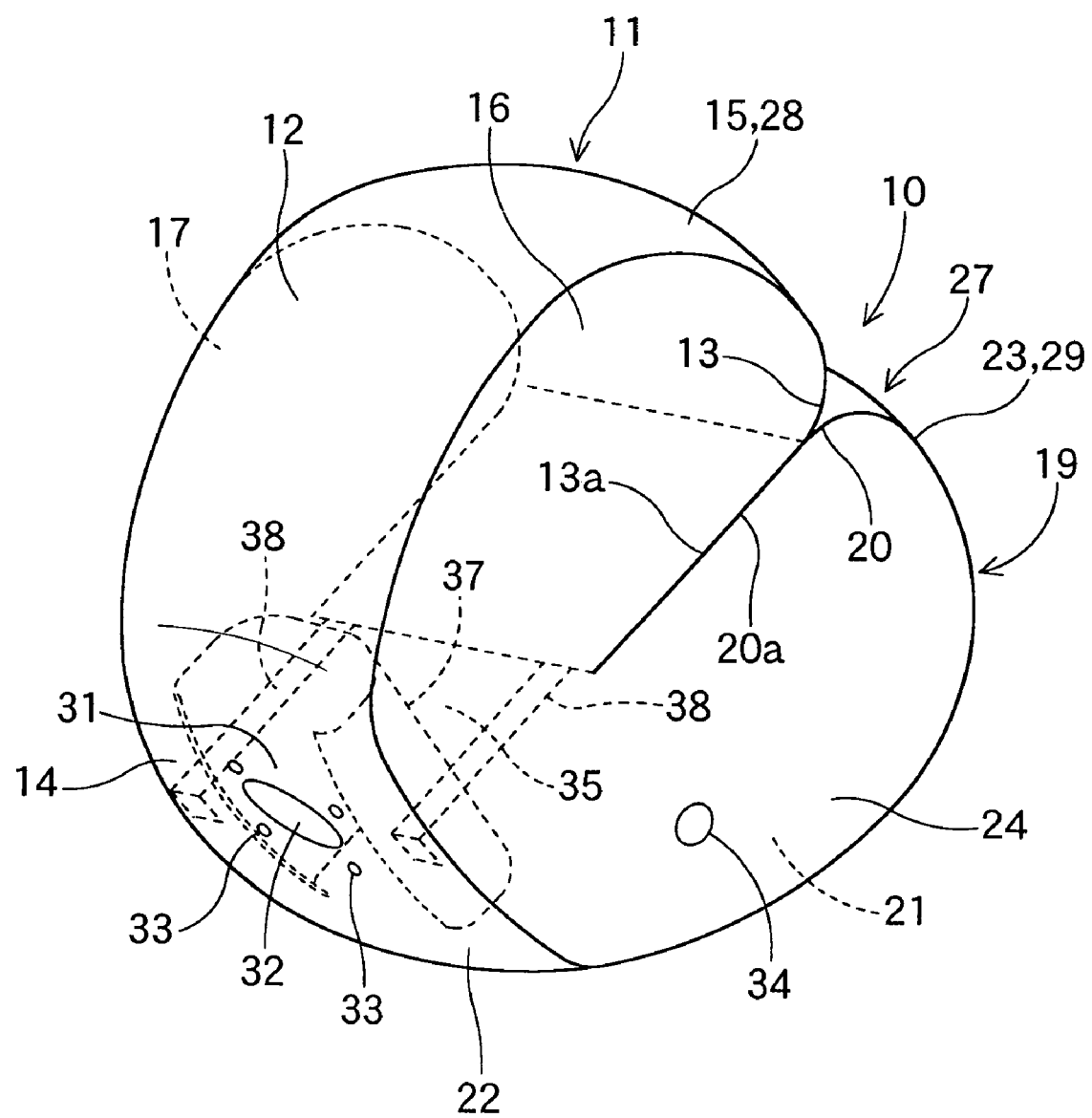
FIG. 3 is a perspective view of an airbag employed in the airbag device of FIG. 1, as inflated by itself.
Figure 4:
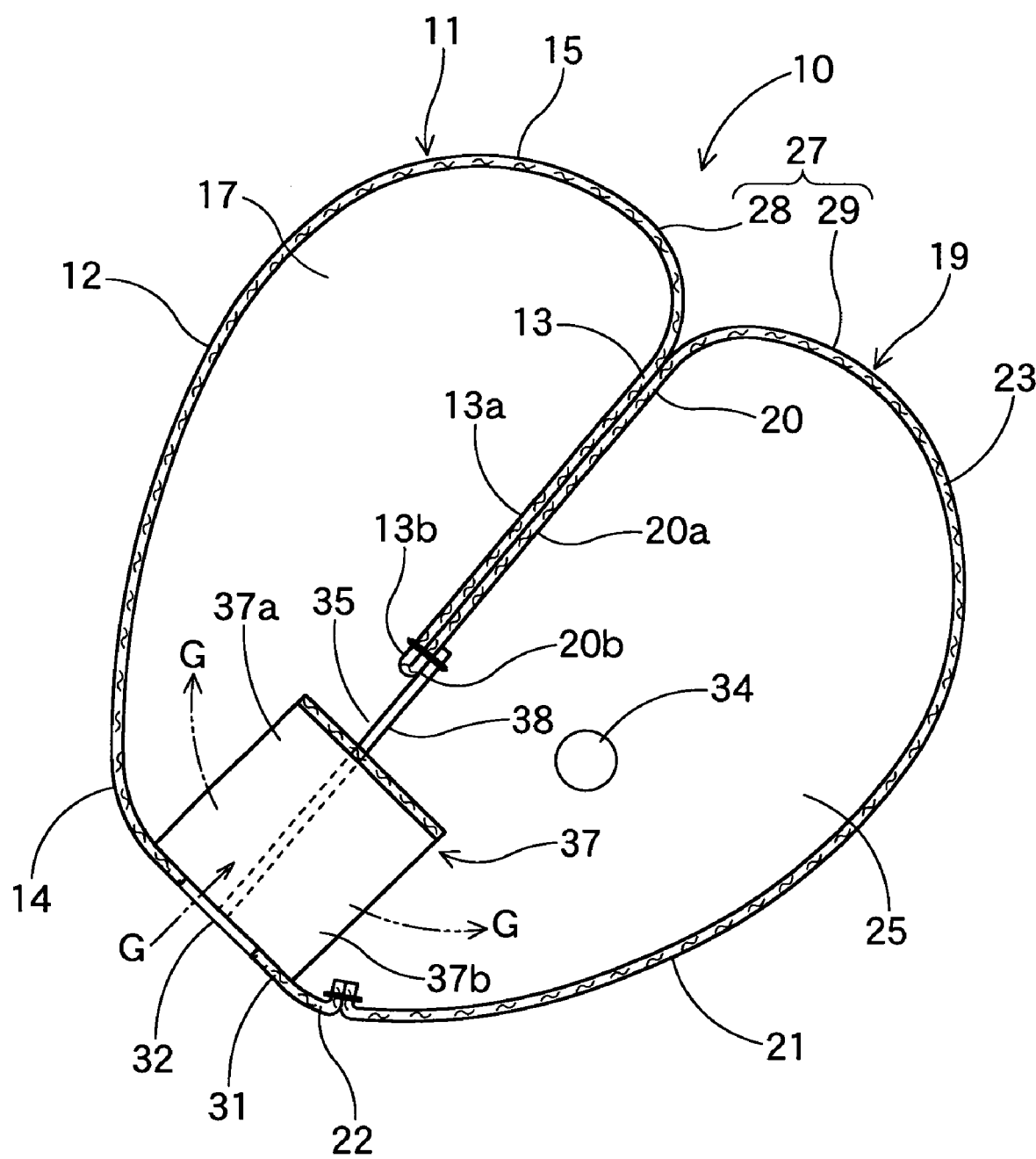
FIG. 4 is a vertical section of the airbag of FIG. 3 as inflated by itself.
Figure 6:
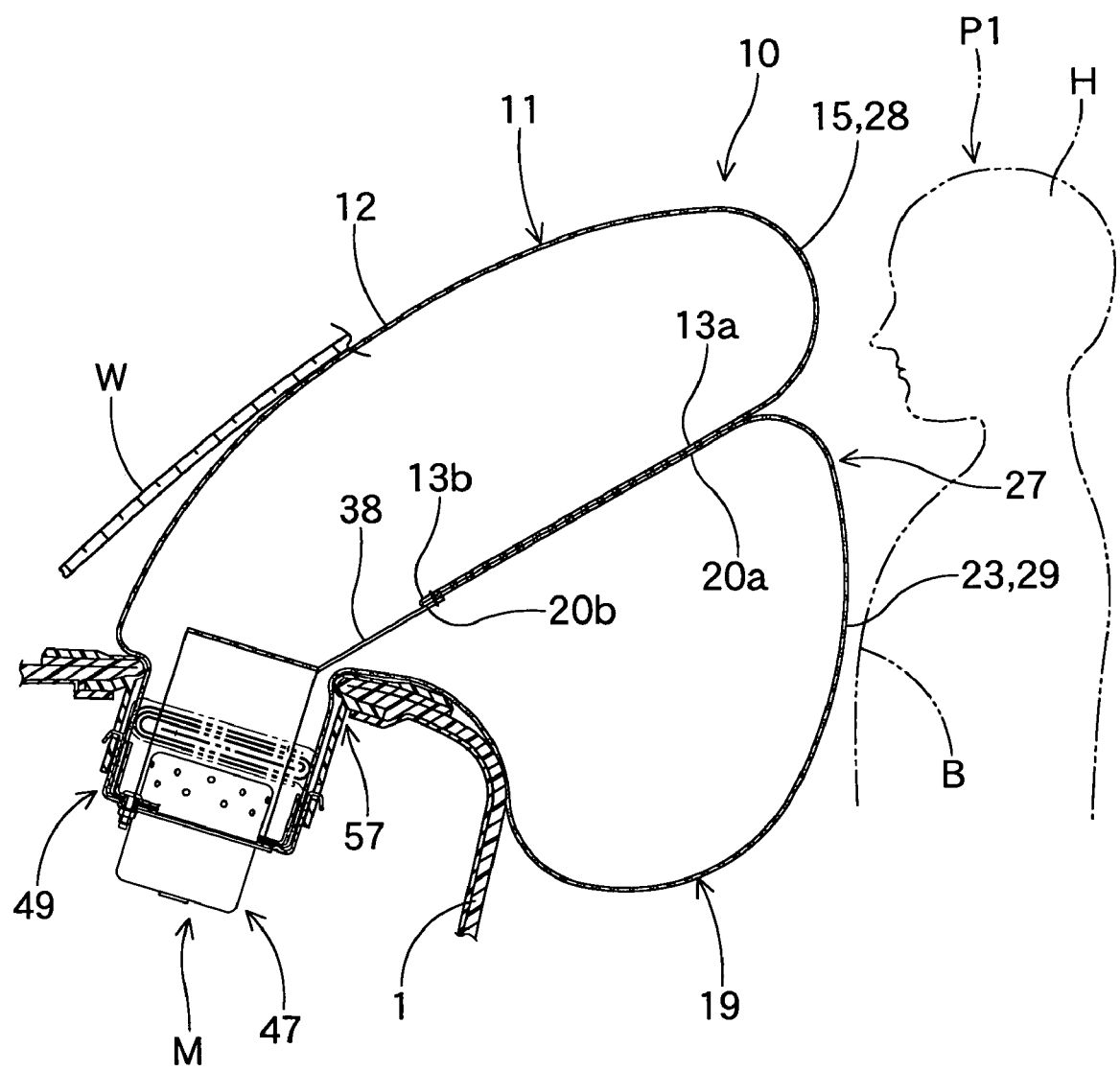
FIG. 6 is a schematic view of the airbag device of FIG. 1 in service, as viewed from side of vehicle.

As shown in FIGS. 3 and 4, the airbag 10 has a substantially square conical shape as inflated completely, and includes an upper inflatable portion 11 and a lower inflatable portion 19 arranged vertically at airbag inflation. The upper and lower inflatable portions 11 and 19 have substantially the same transverse widths when completely inflated. A rear side face of the airbag 10 as completely inflated serves as a restraint face 27 to confront an average-sized occupant P1 or a small-sized occupant P2 (refer to FIGS. 6 and 7) seated in front passenger's seat. A rear side face of the upper inflatable portion 11 is an upper restraint face 28 defining an upper part of the restraint face 27, and a rear side face of the lower inflatable portion 19 is a lower restraint face 29 defining a lower part of the restraint face 27. As shown in FIG. 6, in the illustrated embodiment, as the airbag 10 is completely inflated, the upper restraint face 28 is arranged to confront a head H of the average-sized occupant P1 seated in front passenger's seat, and the lower restraint face 29 is arranged to confront a breast B of the occupant P1.

The upper inflatable portion 11 as the airbag 10 is completely inflated includes a top wall 12 arranged on top, a lower wall 13 arranged in a lower side, a front wall 14 arranged in a front side, a rear wall 15 arranged in a rear side, a left wall 16 arranged in a left side, and a right wall 17 arranged in a right side. Likewise, the lower inflatable portion 19 includes a top wall 20, a lower wall 21, a front wall 22, a rear wall 23, a left wall 24, and a right wall 25. In the foregoing embodiment, faces of the rear walls 15 and 23 in the upper and lower inflatable portions 11 and 19 oriented rearward of vehicle serve as the restraint face 27.

In the airbag 10, the left wall 16 of the upper inflatable portion 11 and the left wall 24 of the lower inflatable portion 19 are joined with each other at a front part, and are made of a single base cloth 39. Likewise, the right wall 17 of the upper inflatable portion 11 and the right wall 25 of the lower inflatable portion 19 are joined with each other at a front part, and are made of a single base cloth 39. The front wall 14 of the upper inflatable portion 11 and the front wall 22 of the lower inflatable portion 19 are continuous, and there is a round gas inlet port 32 for taking in inflation gas G. A plurality of mounting holes 33 are formed around the gas inlet port 32 for inserting bolts 45b of the retainer 45 there through to secure the periphery 31 of the gas inlet port 32 to the bottom wall 50 of the case 49. The lower inflatable portion 19 is provided in the left and right walls 24 and 25 with each one round vent hole 34 for emitting extra gas G flowing in the airbag 10.

As shown in FIGS. 3, 4, 6 and 7, the lower wall 13 of the upper inflatable portion 11 and the top wall 20 of the lower inflatable portion 19 contact and overlap with each other when the airbag 10 is completely inflated. Contacting portions (faces) 13a and 20a of the walls 13 and 20 have enough areas to stay contacted even when a part of the occupant P1 or P2 is restrained by either the upper inflatable portion 11 or the lower inflatable portion 19. More specifically, if an occupant P2 engages the lower restraint face 29 of the lower inflatable portion 19, for example, a part of the lower restraint face 29 is recessed forward as indicated by double-dotted lines in FIG. 7, and a root part of the top wall 20 is pulled and separated from the lower wall 13. The areas of the contacting portions 13a and 20a are predetermined so wide that a part of the lower wall 13 near a leading end 13b and a part of the top wall 20 near a leading end 20b stay in touch with each other even in that case. In the foregoing embodiment, the lower wall 13 and the top wall 20 are made integrally of a single base cloth 40 continuing at the leading ends 13b and 20b.

FIGS. 3 and 4 illustrate the airbag 10 inflated by itself. However, if the airbag 10 is actually inflated by itself, the upper inflatable portion 11 flaringly inflates forward, and therefore, at completion of inflation, the lower wall 13 and the top wall 20 do not contact each other. When mounted on vehicle, since the top wall 12 of the upper inflatable portion 11 is held by a later-described wind shield W, the upper inflatable portion 11 is suppressed from shifting forward. That is, by being held by the wind shield W, the airbag 10 mounted on vehicle inflates with the lower wall 13 and the top wall 20 contacted in portions 13a and 20a. FIGS. 3 and 4 illustrate the completely inflated airbag 10 held by the wind shield W.

As shown in FIGS. 3 and 4, the airbag 10 includes a flow regulating cloth 37 and tethers 38. The flow regulating cloth 37 is arranged in a generally cylindrical shape along front-rear direction. Front and rear end portions 37a and 37b of the flow regulating cloth 37 are open ends, such that inflation gas G flown in from the gas inlet port 32 is fed into each of the upper inflatable portion 11 and lower inflatable portion 19. A part of the airbag 10 where the flow regulating cloth 37 is arranged, i.e., a part of the completely inflated airbag 10 positioned forward of the lower wall 13 and the top wall 20, serves as a communication hole 35 communicating the upper inflatable portion 11 with the lower inflatable portion 19. The communication hole 35 is also communicated with the gas inlet port 32. Each of the tethers 38 has a band shape, and connects leading ends 13b and 20b of the lower wall 13 and top wall 20 and the periphery 31 of the gas inlet port 32. In the illustrated embodiment, two tethers 38 are provided in the vicinities of left and right ends of the lower and top walls 13 and 20.

Figure 5:
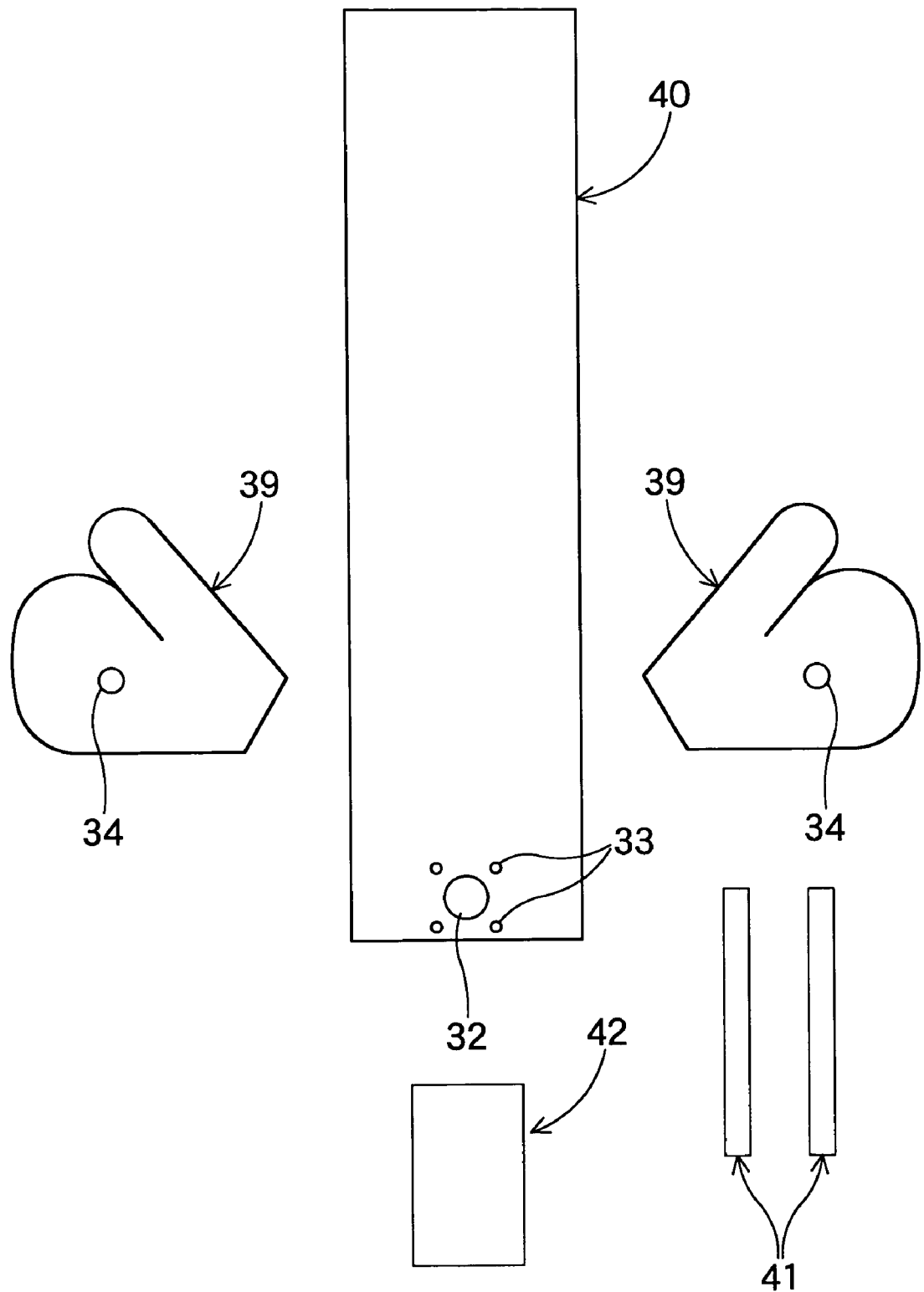
FIG. 5 shows plan views of constituent parts of the airbag of FIG. 3.

As shown in FIG. 5, in the illustrated embodiment, the airbag 10 is manufactured by sewing up three base cloths, i.e., generally oval first base cloths 39, which define left and right walls 16, 17, 24 and 25 of the upper and lower inflatable portions 11 and 19, and a second base cloth 40, which defines the top wall 12, the lower wall 13, the front wall 14 and the rear wall 15 of the upper inflatable portion 11, and the top wall 20, the lower wall 21, the front wall 22 and the rear wall 23 of the lower inflatable portion 19. The base cloths 39 and 40, and base cloths 41 and 42 forming the tethers 38 and the flow regulating cloth 37 are made of flexible woven fabric of polyester, polyamide or the like without silicone coating or the like. The second base cloth 40 is provided in an end of length direction with the gas inlet port 32 and the mounting holes 33.

Mounting of the airbag device M on the vehicle is now described. The airbag 10 is preliminarily formed by sewing up the individual base cloths 39, 40, 41 and 42 at predetermined portions. Thereafter, the retainer 45 is placed inside the airbag 10, and then the airbag 10 is folded with the bolts 45b projected from the mounting holes 33. The folded airbag 10 is wrapped by a breakable wrapping sheet 43 (refer to FIG. 2) to keep the folded-up configuration. Then, the folded airbag 10 is located on the bottom wall 50 of the case 49 from the opening 49a by inserting the individual bolts 45b into the mounting holes 52 from above. Subsequently, an upper portion of the body 47a of the inflator 47 is inserted through the insert hole 51, the gas inlet port 32, and the base 45a of the retainer 45 from lower side, and the individual bolts 45b projected downward from the bottom wall 50 are inserted through the mounting holes 47d of the flange 47c of the inflator 47. Thereafter, the bolts 45b projected from the flange 47c are fastened into the nuts 46. Thus the folded airbag 10 and the inflator 47 are attached to the bottom wall 50 of the case 49.

Thereafter, the side wall 54 of the case 49 is inserted within the joint wall 61 of the airbag cover 57 in the dashboard 1 mounted on the vehicle, and the individual retaining pawls 55 of the case 49 are inserted into the retaining holes 62 in the joint wall 61. Thus the retaining pawls 55 are retained by the joint wall 61. If the bolts 7 are further fastened into the nuts 53a of the individual brackets 53 through the mounting seats 6c, the airbag device M for front passenger's seat is mounted on the vehicle.

Alternatively, the mounting of the airbag device M on the vehicle may be done by preliminarily attaching the airbag 10 and the inflator 47 to the case 49, attaching this case 49 to the airbag cover 57 of the dashboard 1, and then securing this airbag device M to vehicle body with the bolts 7 when mounting the dashboard 1 on the vehicle.

After mounting the airbag device M on the vehicle, when inflation gas G is discharged from the individual gas discharge ports 47b of the inflator 47, the airbag 10 inflates and breaks the wrapping sheet 43, breaks the breakable portion 60 and opens the doors 58F and 58B, as indicated by the double-dotted lines in FIGS. 1 and 2. Then the airbag 10 protrudes from an opening 60 provided by opening of the doors 58F and 58B and completes inflation while emitting extra inflation gas G from vent holes 34. Here, reference numerals W in FIGS. 1, 6 and 7 designate a windshield.

In the airbag device M for front passenger's seat according to the present invention, at complete inflation of the airbag 10, breast B of an occupant P1 usually engages the lower restraint face 29 located in rear side of the lower inflatable portion 19, and then a head H of the occupant P1 engages the upper restraint face 28 located in rear side of the upper inflatable portion 11. The lower wall 13 of the upper inflatable portion 11 and the top wall 20 of the lower inflatable portion 19 contact and overlap with each other when the airbag 10 is completely inflated, and contacting portions (faces) 13a and 20a have enough areas to stay in the contacting condition even when either the upper inflatable portion 11 or the lower inflatable portion 19 restrains a part of the occupant P1. Accordingly, even if a part of the lower restraint face 29 contacting the breast B of the occupant P1 recesses forward and thereby a tension is generated in the walls 20, 21, 22, 23, 24 and 25 of the lower inflatable portion 19, the lower wall 13 of the upper inflatable portion 11 is not pulled directly along with deformation of the lower inflatable portion 19, since the lower wall 13 of the upper inflatable portion 11 merely contacts and overlaps with the top wall 20 of the lower inflatable portion 19.

In other words, the tension generated in the lower restraint face 29 of the lower inflatable portion 19 by engagement of the breast B of the occupant P1 does not affect the upper restraint face 28 of the upper inflatable portion 11 to contact with the head H of the occupant P1. Accordingly, in comparison with a case, as in a conventional airbag, where head and breast of an occupant is restrained by one restraint face, the airbag 10 restrains the head H by the restraint face 27 in the upper inflatable portion 11 in a condition that an increase of reaction force caused by the tension is suppressed. As a result, the airbag 10 restrains the head H of the occupant P1 with more cushioning property while suppressing reaction force.

Figure 7:
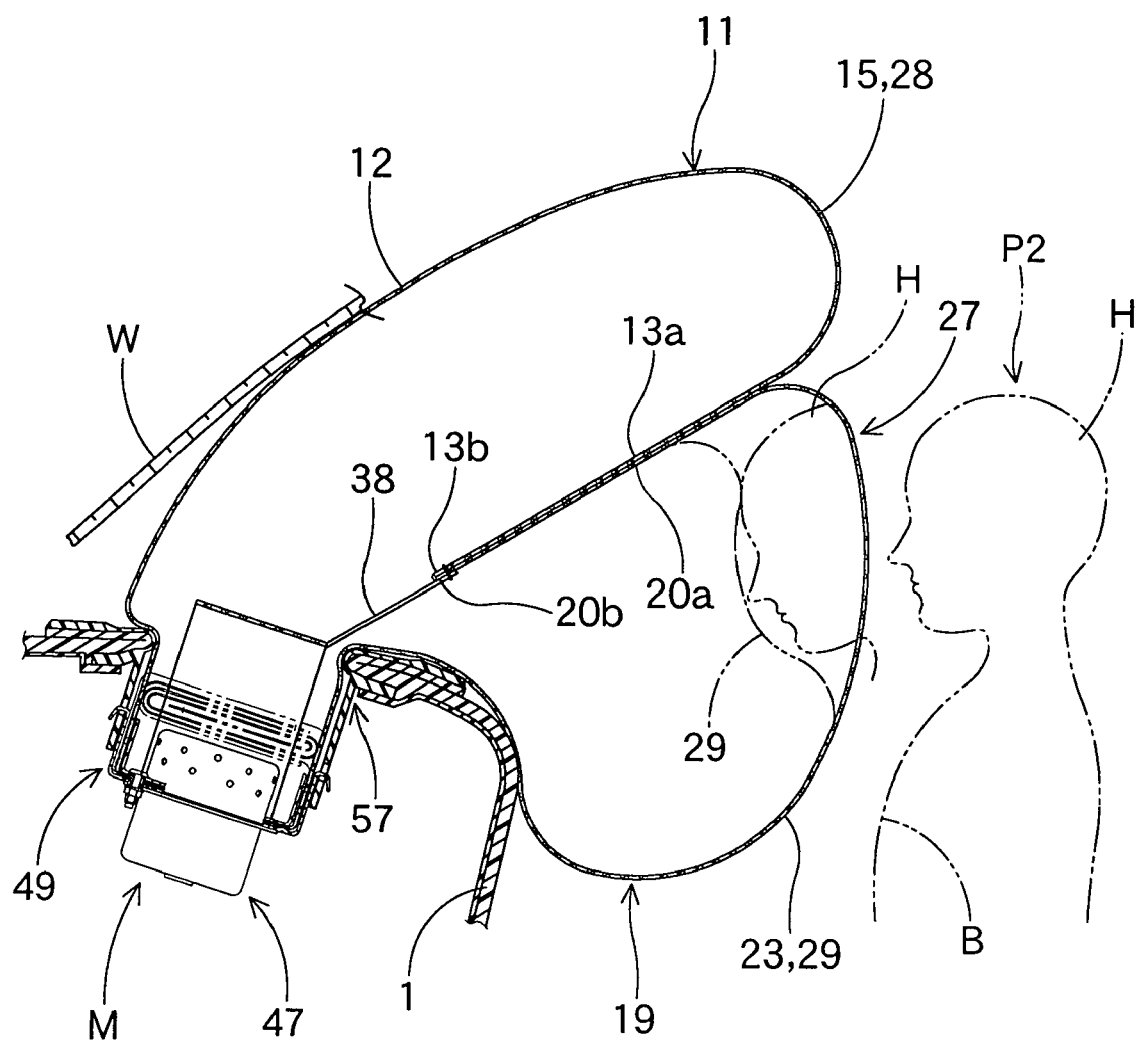
FIG. 7 is also a schematic view of the airbag device of FIG. 1 in service, as viewed from side of vehicle.

Moreover, when a small-sized occupant P2 is seated in the front passenger's seat, head H of the occupant P2 engages the lower restraint face 29 located in rear side of the lower inflatable portion 19, as shown in FIG. 7. At this time, even if the lower restraint face 29 contacting the head H recesses forward and thereby a tension is generated in the walls 20, 21, 22, 23, 24 and 25 of the lower inflatable portion 19, the lower wall 13 of the upper inflatable portion 11 is not pulled directly along with deformation of the lower inflatable portion 19. Accordingly, the inflated upper inflatable portion 11 is not pulled downward nor presses the head H from upward, so that the airbag 10 protects the occupant P2 properly with the lower inflatable portion 19.

Therefore, when the occupants P1 and P2 engage the completely inflated airbag 10, the airbag device M of the present invention protects the occupants P1 and P2 properly while suppressing reaction force.

In the airbag device M for front passenger's seat, furthermore, the inflated airbag 10 is provided forward of the top wall 20 and the lower wall 13 with the communication hole 35 communicating the upper inflatable portion 11 with the lower inflatable portion 19, and includes one gas inlet port 32 that is communicated with the communication hole 35 for feeding the airbag 10 with inflation gas G, in a front part of the airbag 10 as inflated. That is, one inlet port 32 serves to supply inflation gas G both to the upper inflatable portion 11 and the lower inflatable portion 19. Accordingly, supply of inflation gas to the airbag 10 is done by a single inflator 47, SO that the airbag device itself is downsized, and the manufacturing cost of the device is also reduced. In the preferred embodiment, the left wall 16 of the upper inflatable portion 11 and the left wall 24 of the lower inflatable portion 19, and the right wall 17 of the upper inflatable portion 11 and the right wall 25 of the lower inflatable portion 19 are joined with each other at front part, and are made of single base cloth 39, respectively. However, each of the left walls 16 and 24, and the right walls 17 and 25 may be made from separate base cloths on the condition that these walls have the gas inlet port in common. Without considering the above-mentioned working-effect, it will also be appreciated that the upper inflatable portion 11 and the lower inflatable portion 19 are completely partitioned and inflated by separated inflators.

In the airbag device M for front passenger's seat, moreover, the airbag 10 includes tethers 38 connecting front ends 13b and 20b of the lower wall 13 and top wall 20 and periphery of the gas inlet port 32. When the airbag 10 is inflated, the tethers 38 pull the front ends 13b and 20b of the lower wall 13 and top wall 20 toward the gas inlet port 32, and prevent the lower wall 13 and top wall 20 from being separated during inflation of the airbag 10.

Furthermore, the airbag 10 further includes the flow regulating cloth 37 which is open-ended toward the upper and lower inflatable portions 11 and 19 (or in front and rear ends 37a and 37b) for feeding inflation gas G flown in from the gas inlet port 32 to the upper and lower inflatable portion 11 and 19. The flow regulating cloth 37 serves to supply inflation gas G from the gas inlet port 32 to the upper and lower inflatable portion 11 and 19 securely.

What is claimed is:

1. An airbag device for front passenger's seat comprising an airbag folded and housed in a case mounted on an instrument panel in front of front passenger's seat, and deployable rearward and toward an occupant when fed with inflation gas, wherein:
   a rear side face of the airbag as completely deployed confronts the occupant and serves as a restraint face;
   the airbag comprises an upper inflatable portion and a lower inflatable portion arranged vertically at airbag inflation, and rear side faces of each of the upper and lower inflatable portions define upper part and lower part of the restraint face;
   a lower wall of the upper inflatable portion and a top wall of the lower inflatable portion contact and overlap with each other as the airbag is completely inflated;
   a contacting face of the top wall and the lower wall is wide enough to stay contacted when either the upper inflatable portion or the lower inflatable portion restrains a part of occupant; and
   the contacting face of the top wall and the lower wall is wide so that tension generated in one of the upper part and the lower part of the restraint face by engagement of the occupant does not affect the other of the upper part and the lower part of the restraint face when the airbag is completely inflated;
   the airbag further comprises a communication hole located forward of the top wall and the lower wall for communicating the upper inflatable portion with the lower inflatable portion;
   a gas inlet port located in a front part of the airbag as inflated, the inlet port being communicated with the communication hole for feeding the airbag with inflation gas; and
   two tethers connecting front ends of the lower wall and top wall and periphery of the gas inlet port,
   wherein:
   the upper inflatable portion includes a first left wall arranged in a left side and a first right wall arranged in a right side,
   the lower inflatable portion includes a second left wall arranged in a left side and a second right wall arranged in a right side,
   the first left wall and the second left wall are made of a first single base cloth,
   the first right wall and the second right wall are made of a second single base cloth,
   in the first base cloth, the first left wall and the second left wall are joined at a front part, and in the second base cloth, the first right wall and the second right wall are joined at a front part, so that the first base cloth and the second base cloth each is shaped to be separated at a rear part with a slit between the first and second left walls, and a slit between the rear part of the first and second right walls,
   the two tethers are disposed in a vicinity of left and right ends of the lower wall and the top wall,
   the gas inlet port is arranged between the two tethers.

2. An airbag device for front passenger's seat according to claim 1, wherein the airbag comprises a flow regulating cloth being open-ended toward the upper and lower inflatable portions for supplying inflation gas flown in from the gas inlet port to the upper and lower inflatable portions.

* * * * *